Patented Jan. 14, 1930

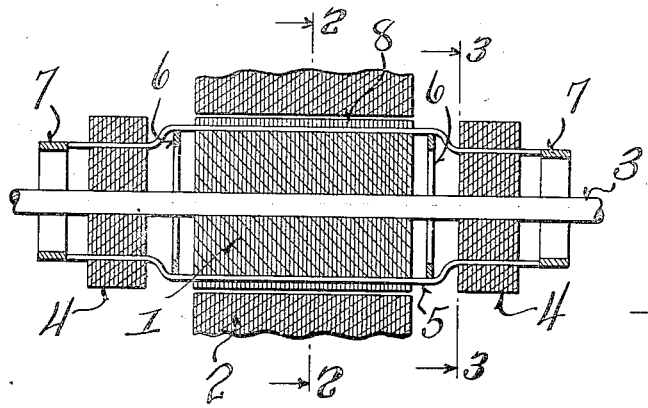
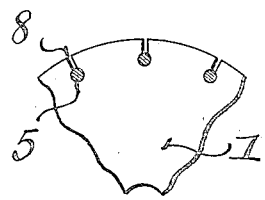
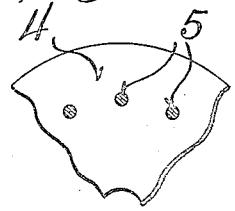
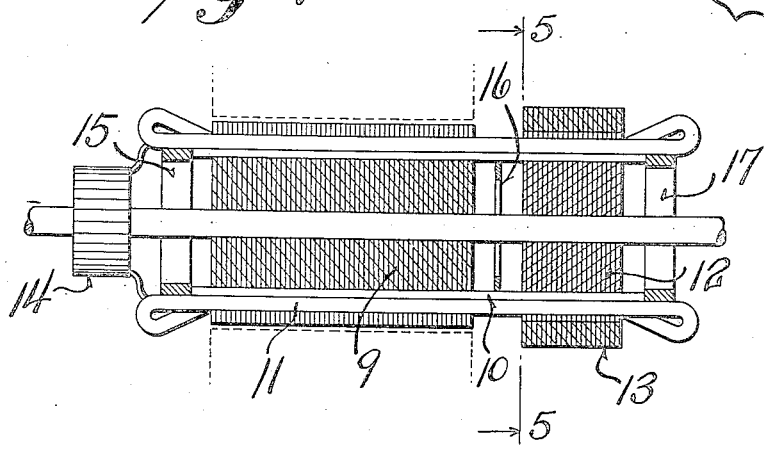
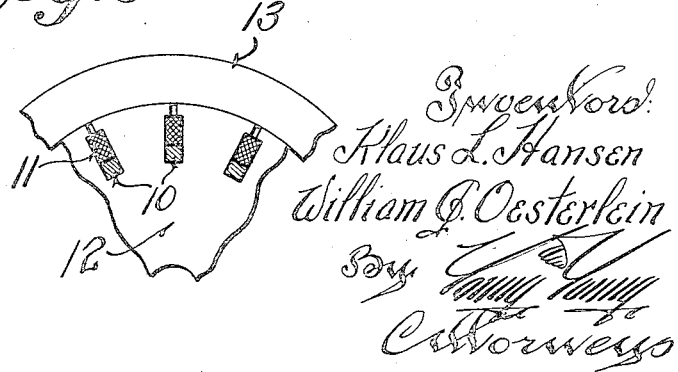

1,743,818

UNITED STATES PATENT OFFICE

KLAUS L. HANSEN AND WILLIAM J. OESTERLEIN, OF MILWAUKEE, WISCONSIN

SELF-STARTING INDUCTION MOTOR

Application filed July 10, 1926. Serial No. 121,603.

This invention relates to induction motors.

In induction motor practice, it is well known that the secondary member, usually the rotating element of an induction motor, must have a relatively high resistance in order to develop a high starting torque with comparatively low starting current. On the other hand, the high secondary resistance causes a high slip when running under normal load with consequent loss of power. Attempts have been made to employ the squirrel cage rotor, as it is the most desirable construction for the majority of applications, and these attempts have been directed towards providing a double squirrel cage, one of which has high resistance, and the other low resistance, with the low resistance cage spaced a material distance from the periphery of the rotor, and with the high resistance cage located adjacent the periphery of the rotor.

While this type of motor is an improvement, nevertheless, it has serious drawbacks, as its characteristics are bad. The power factor is reduced by the increased reactance of the secondary or low resistance, deeply imbedded squirrel cage. Further than this, the double squirrel cage does not permit of ready means of proportioning the high resistance and the low resistance current paths of the secondary so as to obtain the most desirable combinations for various applications. In addition to this, after a factory is equipped for the manufacture of one type of motor of this character, it is practically impossible to make a motor of substantially the same size but having widely different characteristics.

Objects of this invention are to provide a novel form of induction motor in which a double squirrel cage is not employed, but in which a more practical and electrically more perfect construction is followed, whereby the characteristics of the motor are very much improved over anything heretofore known.

Further objects are to provide an induction motor in which means are provided for readily proportioning the high resistance and the low resistance paths, although only one squirrel cage is employed. Further objects are to provide for a wide variation in this proportioning, so that motors may be produced to fit a large variety of orders and to have characteristics particularly adapted for the peculiar work for which the motor is ordered.

Further objects are to provide a novel form of induction motor in which compensation may be had so that the power factor may be made unitary, or may be leading, if desired, so that the motor while functioning in the capacity of a motor may, nevertheless, be employed to improve the power factor of the system to which it is connected.

Further objects are to provide an induction motor in which a compensating winding may be most readily combined with a squirrel cage type of rotor, and in which speed regulation may be secured.

Further objects are to provide a form of induction motor in which there is a direct cooperative action between the compensating windings and the squirrel cage of the rotor, so that the short circuit current at the brushes is reduced to a minimum under starting and running conditions either when running loaded or idle, whereby the commutation is markedly improved.

Further objects are to provide a self-starting induction motor in which the inrush of current at starting is reduced to a minimum, and in which the current short circuited by the brushes when the motor is at a standstill, is materially reduced by the coperative action of this compensating winding and the squirrel cage construction.

Embodiments of the invention are shown in the accompanying drawings which are diagrammatic views of different forms of the invention, and in which:—

Figure 1 is a sectional view through an induction motor constructed in accordance with this invention;

Figures 2 and 3 are fragmentary transverse sectional views on the lines 2—2 and 3—3 of Figure 1 respectively;

Figure 4 is a view similar to Figure 1, of a modified form of construction;

Figure 5 is a fragmentary tranverse sectional view on the line 5—5 of Figure 4;

Figure 6:
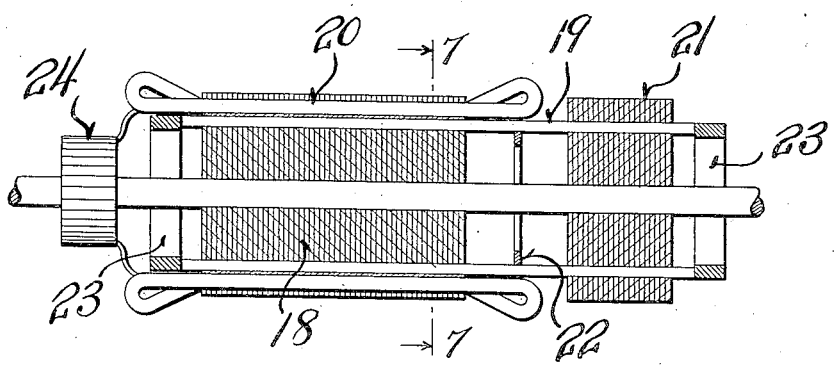
Figure 6 is a sectional view showing a further form of invention.

Referring to Figures 1, 2, and 3 it will be seen that the usual type of laminated rotor 1 is illustrated and that the rotor is mounted within the stator 2. This rotor is carried by the motor shaft 3 in the usual manner, the details of the mounting having been omitted for the sake of clearness. This motor shaft carries a laminated disc-like member 4 at each end of the rotor and spaced therefrom, as indicated in Figure 1. The bars 5 of the squirrel cage are arranged as in the usual manner, but their ends project outwardly a material distance. Immediately adjacent the rotor 1, high resistance rings 6 join the bars 5 of the squirrel cage, and thus provide a closed circuit of relatively high resistance. The bars 5 continue outwardly from this point and are preferably inwardly bent, as shown. They pass through the laminated members 4 which are of similar construction to the rotor 1, and are joined at their outer ends by the low resistance end rings 7. The bars 5 may be mounted in slots 8 formed in the rotor, as indicated in Figure 2, and may pass through apertures formed in the end members 4, as indicated in Figure 3 although, obviously, this arrangement may be varied to alter the electrical characteristics of the motor, as desired.

In the operation of this motor, it may be started with a very small inrush of current from the line, as the current induced in the bars of the squirrel cage is of the same frequency as that of the line at the instant the motor starts. This current passes through the high resistance ring 6 in preference to passing to the low resistance rings 7. The reason for this action is that the cores 4 in which the bars 5 are imbedded, offer a very high reactance, as the frequency is high. Consequently, the current flows primarily through the high resistance rings 6. As the motor speeds up and approximates synchronism, more current will flow to the low resistance rings 7, as the frequency drops in proportion to the increasing speed of the rotor. Consequently, the reactance offered by the members 4 and the bars imbedded therein steadily decreases, as the speed increases.

The net result of this is that the motor offers a high resistance to the current flowing in the squirrel cage at starting and offers a low resistance when the motor approximates synchronous speed. This, as is well known, produces a high starting torque. However, the efficiency of the motor and also the power factor characteristics are not interfered with by the construction defined above, as the current flows through the low resistance rings after the motor has approximated synchronous speed. It is to be particularly noted that the mechanical construction of this motor is such that the relative proportion of resistance in the two paths may be most easily varied, and also that the amount of reactance may be very easily varied by varying the thickness of the end cores 4, for example. In this manner, it is possible to construct a motor to fit any unusual demand that may be made to fulfill certain specified requirements. This alteration in the motor may be easily effected by ordinary methods without requiring a change in the fundamental construction of the motor. In actual practice, this flexibility in design and in electrical characteristics, makes the motor highly satisfactory for commercial production.

Referring to Figures 4 and 5, it will be seen that the same inventive idea is employed in this motor as in that previously described. In this form of the invention the rotor 9, may be provided with slots in which the squirrel cage bars 10 are positioned and, in addition to these squirrel cage bars, an auxiliary compensating winding 11 is employed. This compensating winding, together with the bars 10 extends through the end core 12, as indicated in Figure 4, and the end core may have the slots therein closed by means of the annular member 13. The annular member 13 may comprise a group of punched laminations, as indicated in the drawings, or may be secured by means of banding wires or other constructions of this general type.

The auxiliary winding 11 is connected to a commutator 14 in the usual manner.

The bars 10 are connected at the commutator end by means of a low resistance ring 15, and are connected at the other end of the rotor core by means of a high resistance ring 16. The extreme outer ends of the bars 10 are connected by a low resistance ring 17. It is obvious that the construction indicated in Figure 1, and previously described, could be followed in this form of the invention also, and a member 12 could be placed at each end of the rotor core, as described in connection with Figure 1.

The action of this form of motor is the same as that previously described in regard to the current flow in the squirrel cage. However, a power factor connection may be secured by means of the auxiliary winding 11, as this winding can be supplied in any suitable manner by current of the proper voltage, frequency, and phase.

Figure 7:
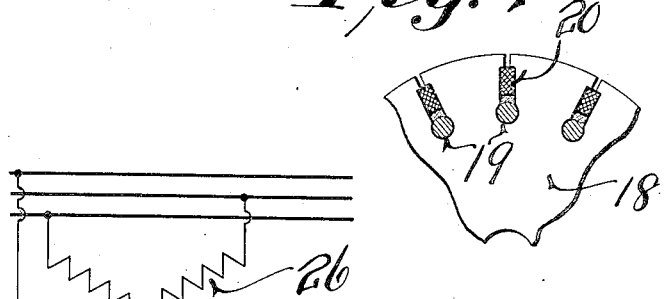
Figure 7 is a fragmentary transverse sectional view on the line 7—7 of Figure 6.

Referring to Figures 6 and 7 which show a further form of the invention, it will be seen that this construction is somewhat similar to that shown in Figures 4 and 5. However, in this construction, the rotor core 18 carries the squirrel cage bars 19, and the auxiliary winding 20, whereby the core 21 receives only the bars 19. Between the core 20 and the core 18 a high resistance ring 22 connects the bars 19. At the ends of the bars 19, low resistance rings 23 are employed. The winding 20 is connected to the commutator 24 in any suitable manner. It is to be noted that the core 21 is of the same diameter as the core 6 in this construction, although obviously it could be made larger, as indicated in Figure 4. The fundamental difference between the forms shown in Figures 4 and 6 is that the auxiliary winding does not pass through the additional core in the form illustrated in Figure 6, while it does pass through the additional core in the form shown in Figure 4. Further, in the form shown in Figure 6, the laminations of the core 21 may have holes punched therein, and the bars 19 may extend directly through these holes without requiring any bending and without requiring an additional annular member, as indicated in Figure 4.

In the form of invention illustrated in Figures 4 to 7, and described above, it is to be noted that the auxiliary winding and the bars of the squirrel cage directly cooperate with each other to prevent excessive current in the conductors, short circuited by the brushes, as the bars 10 tend to choke out a sudden rush of current in the adjacent conductors of the auxiliary winding. Thus, commutation is very much improved by the intimate association of the winding and of the bars. In fact, this effect is more pronounced in the form disclosed in Figure 4 than in that disclosed in Figure 6, although the effect is very marked in the form shown in Figure 6.

Figure 8:
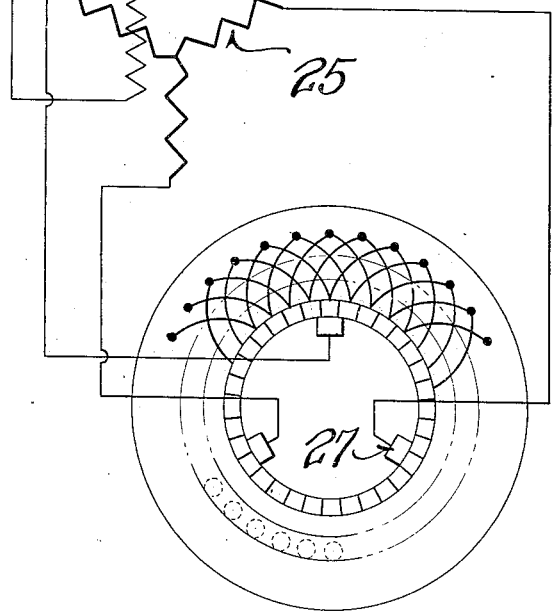
Figure 8 is a diagrammatic view showing the connections for the compensating winding.

Any suitable method may be employed for furnishing the auxiliary winding with current of the proper phase, frequency, and voltage. For example, an auxiliary winding, as indicated by the reference character 25 in Figure 8, may be associated with the stator winding 26. The terminals of the winding 25 may lead to the brushes 27 which operate upon the commutator and may thus conduct current thereto.

It is apparent that the arrangement of the windings, the setting of the brushes, and other features of this type, may be varied without departing from the spirit of the invention, and in this manner any desired power factor may be easily obtained. In fact, if desired, a leading power factor may be secured. Thus, the motor may operate not only in its capacity as a motor, but also may operate to improve the power factor correction of the system to which the motor is connected.

It is to be particularly noted that not only are the electrical characteristics of this motor such as to greatly improve its operation, but also the mechanical construction is such as to readily lend itself to commercial production in a simple and cheap manner.

Although the invention has been described in considerable detail, such description is intended as illustrative rather than limiting as the invention may be variously embodied and as the scope of such invention is to be determined as claimed.

We claim:

1. An induction motor, having a stator and a rotor, said rotor comprising a slotted core and a commutator and having an auxiliary core, a series of conductors carried within the slots of said rotor core and joined by an end ring at one end, and joined by a high resistance end ring at the other end of said rotor, said conductors extending through said auxiliary core and joined by a low resistance end ring on the outer side of said auxiliary core, an auxiliary winding positioned within the slots of said rotor adjacent said conductors and connected in regular order to said commutator, said auxiliary winding extending through said auxiliary core and being closely inductively coupled to said series of conductors and means for supplying alternating current to said commutator.

2. An induction motor, comprising a stator provided with a primary winding and with a secondary winding, a rotor having a main core provided with slots and having a commutator and having an auxiliary core spaced from said main core, conductors within the slots of said main core and projecting through said auxiliary core, low resistance end rings joining the ends of said conductors, an intermediate high resistance ring joining said conductors between said main core and said auxiliary core, an auxiliary winding located within the slots of said main core and connected to said commutator, said auxiliary winding extending through said auxiliary core and being closely inductively coupled to said conductors and brushes for said commutator connected to the secondary winding of said stator.

3. An induction motor, comprising a stator provided with a primary winding and a secondary winding, a rotor having a main core associated with said stator and having an auxiliary core spaced from said stator and from said main core, conductors extending through said main and auxiliary cores and joined at their ends by low resistance end rings and joined intermediate their ends between the main and auxiliary cores of said rotor by a high resistance ring, an auxiliary winding carried by said main core and located closely adjacent said conductors, said auxiliary winding extending through said auxiliary core and being closely inductively coupled to said conductors, a commutator connected to the auxiliary winding, and brushes bearing upon said commutator and connected to said secondary winding carried by the stator.

4. An induction motor comprising a stator and a rotor, said rotor having a main core associated with said stator and having an auxiliary core spaced from said stator and from said main core, said auxiliary core having apertures completely surrounded by magnetic material, conductors extending through said main core and through the apertures of said auxiliary core and joined at their ends by low resistance end rings and joined intermediate their ends between the main and auxiliary cores of said rotor by a high resistance ring, an auxiliary winding carried by said main core and extending through the apertures of said auxiliary core and located closely adjacent said conductors, a commutator connected to the auxiliary winding, and means for supplying alternating current to said commutator.

In testimony that we claim the foregoing we have hereunto set our hands at Milwaukee, in the County of Milwaukee and State of Wisconsin.

KLAUS L. HANSEN.
WILLIAM J. OESTERLEIN.